US012808397B2

(12) United States Patent
Van Der Vennet et al.

(10) Patent No.: US 12,808,397 B2
(45) Date of Patent: Nov. 24, 2026

(54) CONNECTOR FOR TEMPORARY CONNECTING PROFILES

(71) Applicant: BeMatrix, Roeselare (BE)

(72) Inventors: Edwin Van Der Vennet, Aalter (BE); Brecht Deraeve, Roeselare (BE)

(73) Assignee: BEMATRIX, Roeselare (BE)

( * ) Notice: Subject to any disclaimer, the term of this patent is extended or adjusted under 35 U.S.C. 154(b) by 351 days.

(21) Appl. No.: 18/440,164

(22) Filed: Feb. 13, 2024

(65) Prior Publication Data

US 2024/0271646 A1 Aug. 15, 2024

(30) Foreign Application Priority Data

Feb. 14, 2023 (BE) .................................. 2023/5105

(51) Int. Cl.
*F16B 7/04* (2006.01)
*F16B 12/44* (2006.01)

(52) U.S. Cl.
CPC .............. *F16B 7/04* (2013.01); *F16B 7/0453* (2013.01); *F16B 7/0473* (2013.01); *F16B 12/44* (2013.01); *F16B 2200/205* (2018.08)

(58) Field of Classification Search
CPC ...... F16B 7/0453; F16B 7/0473; F16B 7/187; F16B 2200/205; Y10T 403/557
See application file for complete search history.

(56) References Cited

U.S. PATENT DOCUMENTS

| | | | | |
|---|---|---|---|---|
| 4,556,337 A | | 12/1985 | Marshall | |
| 4,799,819 A | | 1/1989 | Swoboda | |
| 4,974,987 A | * | 12/1990 | Smock | F16B 7/046 403/255 |
| 5,315,805 A | | 5/1994 | Harsch | |
| 2011/0277417 A1 | | 11/2011 | Welcel | |
| 2016/0208836 A1 | * | 7/2016 | Sint Nicolaas | F16B 7/046 |

FOREIGN PATENT DOCUMENTS

| | | | | | |
|---|---|---|---|---|---|
| BE | 1020560 A3 | | 12/2013 | | |
| DE | 1807892 A1 | | 2/1970 | | |
| DE | 3602686 A1 | * | 8/1987 | | F16B 12/30 |
| FR | 2634525 A1 | | 1/1990 | | |
| KR | 20220030709 A | | 3/2022 | | |
| LV | 11054 B | * | 4/1996 | | F16B 7/046 |

OTHER PUBLICATIONS

Belgian Search Report from corresponding BE Application No. 202305105, Aug. 10, 2023.

* cited by examiner

*Primary Examiner* — Michael P Ferguson
(74) *Attorney, Agent, or Firm* — Workman Nydegger

(57) ABSTRACT

A connector for detachably connecting profiles includes a housing; a first and a second clamping component, each comprising at their ends a clamping hook; an activation mechanism adapted to shift the first and second clamping components concerning the housing; a first and a second pair of guide components adapted to define a trajectory of the first and second clamping components, respectively, during the shift, so that at least during a part of the trajectory the distance in the transverse direction Y between the clamping hooks is varied, and at least during a part of the trajectory the distance in longitudinal direction X between the housing and the clamping hooks is varied.

12 Claims, 14 Drawing Sheets

CONNECTOR FOR TEMPORARY CONNECTING PROFILES

TECHNICAL SCOPE

The present invention relates in general to connectors for temporary connecting profiles, for example in a temporary booth for trade fairs or expositions. In particular, the invention provides a solution for a profile connector which allows for the temporary connection of long load-bearing structural profiles, wherein a strong and robust connection is realized, and fast assembly and disassembly are possible.

CROSS REFERENCE TO RELATED APPLICATIONS

This application claims priority of Belgian patent application BE2023/5105, filed Feb. 14, 2023, the contents of which are incorporated by reference.

BACKGROUND OF THE INVENTION

During trade fairs and exhibitions, temporary trade fair booths or exhibition booths are used, which are constructed for use during the event, and these are dismantled afterwards. In a modular solution for booth construction, as described for example in BE1020560A3, a set of standard frames is provided, using which a temporary booth according to the desired design can be constructed. In addition to the frame shaped modules, profiles are also provided within such a system: elongated hollow beams that can be integrated into the booth and to which functional elements can typically be attached. For example, a profile may contain a slot in its outer surface, which is adapted to slide a lighting rail into it. Such profiles should also be able to be connected to each other in the temporary construction, for example in a T-configuration or in a longitudinal fashion. Given the ever-increasing size of the desired exhibition booths, there is a need to be able to use profiles of large length, for example in the order of 6 m length. Moreover, these profiles must serve as load-bearing construction elements, given that, for example, lighting is suspended from them. Consequently, there is a need for a connector which allows such long load-bearing construction profiles to be connected in a robust way.

In the prior art, solutions are known to connect profiles in a detachable manner. For example, a connector provided with clamping hooks may be used. The connector is placed within the cavity of a first profile, and is capable of clamping onto a second profile using the clamping hooks. On the second profile, for example, a central longitudinal slot may be provided for this purpose.

In a first group of such profile connectors, the connector has two legs, which are each provided with a clamping hook. The legs are moved apart or towards each other transversely to open and close the clamping hooks, respectively. Examples can be found in DE1807892A1 and KR20220030709A. For example, in DE1807892A1, a screw with wedge-shaped component is used to drive the legs of the connector apart. By placing the clamping hooks, in a closed position, within the slot of a profile, and then using the wedge to open the hooks, clamping of the connector within the slot is achieved. The connectors proposed in DE1807892A1 and KR20220030709A only allow the connection of profiles on which a central slot is present, and only a connection of profiles according to a T-configuration is possible. Moreover, by driving the legs apart transversely, a perfect clamping around the slot edges will not always be obtained. After all, due to tolerances on the slot dimensions, wear or usage conditions, deviations may occur in the form of slot, so that no perfect connection of the connector to the second profile is obtained.

In a second group of profile connectors with clamping hooks, an elastic material or spring element is used. Examples can be found in FR2634525A1 and U.S. Pat. No. 4,556,337A. The connector has two legs, which are each provided with a clamping hook. The legs can be closed and opened according to a hinged motion, accompanied by a rotation of each of the legs around a fixed point. Closing the legs is accompanied by compression of an elastic material or spring element. When closed, the clamping hooks are inserted into the profile slot, and under the influence of the spring force, the legs open again so that the clamping hooks engage the slot. There is another example in U.S. Pat. No. 5,315,805A, wherein the second profile does not contain a central slot onto which can be clamped, but T-shaped elements onto which can be clamped along the outside. Such solutions based on spring force or elastic deformation allow profiles to be joined, but—given that manual compression against the spring force should be possible—do not allow for a very strong connection. In FR2634525A1 and U.S. Pat. No. 4,556,337A, it is possible to push against a connector leg by tightening a screw to better fasten the connector, but this requires an additional operation which hinders the rapid connection of profiles. Finally, even in this group of solutions, one is limited to the movement imposed by the hinge concept, making it impossible to match the clamping to the exact slot shape, taking into account tolerances, wear and usage conditions.

It is an object of the present invention to describe a solution that overcomes one or more of the described disadvantages of prior art solutions. More specifically, it is an object of the present invention to describe a connector for temporarily connecting long load-bearing structural profiles, wherein a strong and robust connection is realized, and rapid assembly and disassembly are possible.

SUMMARY OF THE INVENTION

According to a first aspect of the present invention, the objectives identified above are achieved by a connector for detachably connecting profiles, as defined by claim 1, wherein the connector comprises:

- a housing extending along a longitudinal direction X, which is adapted to be placed within a tubular first profile;
- a first and a second clamping component, which are partially located, according to longitudinal direction X, within the housing, wherein the first and second clamping components each comprise a clamping hook at their ends, at least partially deflecting according to a transverse direction Y, wherein the clamping hooks are adapted to engage undercuts which are provided on the surface of a second profile;
- an activation mechanism which is adapted to move the first and second clamping components with respect to the housing, wherein the movement of each of the respective clamping components is a translation;
- a first and a second pair of guide elements, each pair comprising a guide element which is provided on the housing, and a corresponding guide element which is provided on the first and second clamping component, respectively, wherein the first and second pairs of guide elements are adapted to define a trajectory of the first and second clamping components, respectively, during the translation, respectively, so that at least during a part of the trajectory the distance in transverse direction Y between the clamping hooks is varied, and at least during a part of the trajectory the distance in longitudinal direction X between the housing and the clamping hooks is varied.

In other words, the invention relates to a connector for connecting a profile. A profile is an elongated, typically hollow bar, for example made of aluminium or steel. Usually, the profile has a rectangular cross-section, which is bounded by four side faces, but also other cross-section forms are possible. The connector allows to connect a first and second profile with each other, in a detachable manner. The detachable connection refers to the fact that after connecting, the profiles can be detached from each other again, without permanent deformation or damage. The first profile is tubular, at least along a portion of its length. This means that the profile comprises, at least at its end, a cavity which is bounded by a wall, the cavity being adapted to receive the connector. The second profile comprises an outer surface in which undercuts are provided. In other words, the profile surface comprises undercut grooves or undercut edges. This means that one or more slots, recesses or grooves are present on the outer surface of the profile, which are bounded by hook-shaped edges. The hook-shaped edge typically comprises a protruding portion which is substantially perpendicular to the profile wall, and an end which is substantially parallel to the profile wall. The hook-shaped edges may point away from each other, i.e., the ends deflect toward each other, or may point towards each other, i.e., the ends deflect away from each other.

The connector comprises a housing, which extends according to a longitudinal direction X. In a positioned state of the connector, the longitudinal direction X of the connector corresponds to the longitudinal direction of the profile. For example, the housing may be beam-shaped, and bounded by a top surface and bottom surface which are located in an XZ plane, and two side surfaces which are located in an XY plane. Here, the Y direction corresponds to the transverse direction, and the Z direction corresponds to the height direction of the connector. The housing has a front side in which one or more openings are present, through which clamping components protrude outward with respect to the housing.

The connector comprises a first and a second clamping component. The clamping components are movable with respect to the housing, via the one or more openings in the front side of the housing. The clamping components extend along the longitudinal direction X, and are typically located partially inside and partially outside the housing. In one embodiment, the connector may be placed in a state wherein the clamping components are fully retracted and are thus completely located within the housing. The clamping components each comprise a clamping hook at their front end. A clamping hook typically has a first portion located along longitudinal direction X, and a second portion that deflects with respect to the longitudinal direction X. In this way, the clamping hook deflects, at least partially, in the transverse direction Y. For example, the first portion of the clamping hook is an edge located in an XZ plane, parallel to longitudinal direction X, and the second portion of the clamping hook is an edge located in a YZ plane, parallel to transverse direction Y. The clamping hooks are formed such that they engage the undercuts provided in the surface of the second profile, so that clamping occurs between the clamping hooks on the one hand and the hook-shaped edges on the second profile on the other hand. After placing the connector in the first profile, a T-connection can be formed in this way between the first and second profiles. In accordance with which undercuts are located on the second profile, the ends of the clamping hooks may be such that they deflect towards each other, or deflect away from each other.

The first and second clamping components are movable with respect to the housing by means of an activation mechanism. An activation mechanism is typically an assembly of one or more mechanical components, such as a screw, plate, cam, lever, etc, which is adapted to cause the movement of the clamping components. During this movement, the first clamping component is moved according to a shift or translation, and the second clamping component is also moved according to a shift or translation. Thus, a clamping component is moved as a whole, each point being shifted over the same distance, without the occurrence of a rotation. The movement of a clamping component is a shift or translation between two extreme states, wherein the clamping component can be fixed at any intermediate state, so that a particular configuration or position of the two clamp components is obtained.

The connector comprises a first and a second pair of guide elements. The first pair of guide elements comprises a guide element which is provided on the housing, and a corresponding guide element which is provided on the first clamping component. Analogously, the second pair of guide elements comprises a guide element which is provided on the housing, and a corresponding guide element which is provided on the second clamping component. The first and second pairs of guide elements are adapted to define a trajectory of the first and second clamping components during the translation. In other words, the guide elements define a well-defined path that will be followed by the clamp components during their movement. The clamping components are thus required to follow a defined path during their movement. For example, a pair of guide elements may comprise a protruding element, such as a pin or screw, which is formed on a clamping component, and a recess which is formed in the housing, such as a slot, slit, or groove. In this embodiment, the protruding element is adapted to slide within the recess. In another embodiment, the protruding element is attached to the housing, while the recess is located on the clamping component. In yet another embodiment, a pair of guide elements comprises a wheel or rolling element which is adapted to roll on a track or edge. For each clamping component, there is at least one pair of guide elements. In possible embodiments there are multiple pairs of guide elements per clamping component.

The trajectory imposed by the guide elements is such that at least during a part of the trajectory the distance in transverse direction Y between the clamping hooks is varied, and at least during part of the trajectory the distance in longitudinal direction X between the housing and the clamping hooks is varied. This means that during the movement of the clamping components, the clamping hooks are moved towards or away from each other on the one hand, i.e. the closing and opening of the clamping hooks respectively, and the distance in longitudinal direction between a clamping hook and the housing changes on the other hand, i.e. a linear movement of the clamping hooks. Here, the closing/opening on the one hand and the linear displacement on the other hand may occur consecutively, or simultaneously, or partially consecutively and partially simultaneously. For example, the guide element on the housing may be implemented as a slot with a slanted portion, followed by a straight portion, and the guide element on the clamping component may be implemented as a pin that can slide within the slot. During the sliding of the pin in the slanted portion of the slot, the clamping hooks are closed and, at the same time, the clamping hooks are retracted with respect to the housing. During the subsequent sliding of the pin in the straight portion of the slot, only the clamping hooks are retracted further, while their mutual distance no longer changes. In another embodiment, the slot on the housing consists of a straight portion in a transverse direction followed by a straight portion in a longitudinal direction, so that first the clamping hooks are closed without linear movement, and then the retraction of the clamping hooks with respect to the housing takes place. In yet another embodiment, the slot only has a slanted portion, so that the closing of the clamping hooks and their retraction always take place simultaneously.

The invention comes with several advantages. First of all, the movement of the clamping hooks is such that they are not only opened and closed, but also such that the distance in longitudinal direction with respect to the housing is adjustable. Consequently, the connector allows clamping to be realised by opening/closing the clamping hooks in the transversal direction, as well as tightening the connector by pulling the one profile towards the other. In this way, the clamping hooks are brought into the best-fit configuration, for perfectly engaging the hook-shaped edges of the undercuts in the profile surface. Since the linear distance to the housing is adjustable, it is possible to respond optimally to existing deviations due to dimensional tolerances, wear and usage conditions such as thermal expansion. Consequently, the adjustable tightening allows optimal clamping in various conditions and profiles, resulting in a strong and robust connection between the profiles. On the one hand, this differs from existing solutions wherein clamping hooks are only opened/closed in the transverse direction but wherein no tensioning is possible in the longitudinal direction. On the other hand, this differs from existing solutions with clamping hooks that perform a rotational movement according to a hinge principle, wherein the linear distance to the housing may vary, but not in an adjustable manner.

Furthermore, the connector allows the realization of a strong connection so that long and load-bearing structural profiles can be reliably connected. Establishing such strong clamping requires a substantial frictional force, which is realizable given that the clamping hooks can be formed as large and strong as necessary. After all, the clamping hooks are perfectly guided during their movement and subsequently fixed according to a certain position, without depending, for example, on a certain spring force or elastic deformation.

Finally, the connector according to the invention allows a user-friendly and rapid assembly and disassembly of profiles. When making a T-connection, the connector can be clamped directly to the desired longitudinal position of a profile; there is no need to insert the connector at one profile end and then shift it over a large length to the desired position. It also allows the connector to first connect the profile such that it is attached but can still be shifted, and subsequently—after shifting to the exact position—to further tighten the connector. Finally, establishing the connection merely requires shifting the clamping components with respect to the housing. Via the activation mechanism, such shifting can be implemented easily, requiring only one control action. In summary, the connector allows to quickly bring the clamping hooks into the best-fitting configuration, adjustable according to the actual situation, resulting in optimal clamping and perfect connection between the profiles.

Optionally, the housing comprises a front side through which the clamping components protrude, and a rear side opposite to the front side, and the rear side comprises two edges or two undercuts which are adapted to allow the engagement of clamping hooks of a neighbouring connector. For example, a rear panel may be present at the rear side of the connector, on which one or more slots with undercuts are provided. By placing a first connector within a first profile, and placing a second connector within a second profile, the clamping hooks of the first connector can engage the undercuts of the second connector. This has the advantage that the profiles can not only be connected according to a T, but can also be connected to each other longitudinally. In another embodiment, the rear wall of the connector comprises two edges, with an opening next to each of the two edges. Via the openings, the clamping hooks of the first connector can be inserted within the housing of the second connector, after which the clamping hooks can engage the edges present on the rear wall of the second connector.

Optionally, the trajectory is defined by the first and second pairs of guide elements such that

- during a first part of the trajectory at least the distance in transverse direction Y between the clamping hooks is varied, and
- during a second consecutive part of the trajectory, the distance in longitudinal direction X between the housing and the clamping hooks is varied, while the distance in transverse direction Y between the clamping hooks is not varied.

In an embodiment, over the first part of the trajectory only the distance in transverse direction Y is varied, for example implemented using a straight slot in transverse direction. The first part of the trajectory then defines only the opening and closing of the clamping hooks. In another embodiment, over the first part of the trajectory, both the distance in transverse direction Y and the distance in longitudinal direction X are varied, implemented, for example, using a slot that is slanted with respect to the longitudinal and transverse directions. In this case, the first part of the trajectory involves both the opening/closing of the clamping hooks and the retraction of the clamping hooks with respect to the housing. Over the second part of the trajectory, only the distance in the longitudinal direction is varied, for example implemented via a straight slot in the longitudinal direction. Consequently, over the second part of the trajectory, only further tightening of the connector takes place, and thus the pulling of the profiles towards each other, with a further increase of the realized clamping.

Optionally, during the first part of the trajectory, the distance in transverse direction Y between the clamping hooks is varied, while also the distance in longitudinal direction X between the housing and the clamping hooks is varied. This may, for example, be implemented using a slot that is slanted with respect to the longitudinal and transverse directions. In this case, the first part of the trajectory involves both the opening/closing of the clamping hooks and the retraction of the clamping hooks with respect to the housing.

Optionally, the clamping hooks each face the inside of the housing, and during the first part of the trajectory, the reduction of the distance in longitudinal direction X between the housing and the clamping hooks is accompanied by the reduction of the distance in transverse direction Y between the clamping hooks. This means that the two clamping hooks have ends that face each other, and are adjusted to engage hook-shaped edges on the profile surface, wherein these hook-shaped edges point away from each other. When connecting the profiles, first the clamping hooks are moved such that they close, and meanwhile the clamping hooks are retracted as well with respect to the housing. In this way, clamping is performed around the undercuts on the profile surface. Subsequently, the clamping hooks are retracted further, so that the connector is tightened further and the profiles are pulled towards each other.

Optionally, the first and second pairs of guide elements each comprise:

- a protruding element which is formed on the first or second clamping component, respectively, for example, a pin or screw, and
- a recess which is formed in the housing, such as a groove or slot made in the housing, wherein the protruding element is adapted to slide into the recess.

The connector thus comprises a first recess and a first protruding element, which together form the first pair of guide elements. The first recess is formed in the housing, and the first protruding element is formed on the first clamping component. During the movement of the first clamping component, the first protruding element slides into the first recess, so that the first clamping component is forced to follow a defined path, track or trajectory. Analogously, the second pair of guide elements is formed by a second recess, which is formed in the housing, and a second protruding element, which is formed on the second clamping component.

Optionally, the first recess is formed on the top surface or the bottom surface of the housing, and the second recess is formed on the top surface or the bottom surface of the housing. The top surface and bottom surface of the housing are located in an XY plane, thus extending according to longitudinal direction X and transverse direction Y. Additionally, the first and second protruding elements each extend in height direction Z, wherein the height direction Z is perpendicular to longitudinal direction X and transverse direction Y.

In one embodiment, the first and second clamping components are each guided by multiple pairs of guide elements. For example, the connector may comprise eight pairs of guide elements, four of which are for guiding the first clamping component and four of which are for guiding the second clamping component. For example, four slots may be present in the top surface of the housing, and four slots may be present in the bottom surface of the housing, and on each of the clamping components, two pins are each present on the upper side and two pins may be present on the lower side.

Optionally, the first and second recesses each comprise:

- a straight portion, along a direction parallel to the longitudinal direction X, and
- a slanted portion, along a direction which is slanted with respect to the longitudinal direction X and with respect to the transverse direction Y, and the slanted section, which is received in the second recess, and the slanted section, which is received in the first recess, extend according to convergent directions. In this regard, the two slanted sections, viewed from front to rear in the longitudinal direction, may either converge or diverge with respect to each other. Typically, the first and second recesses are both formed in the top surface of the housing, or are both formed in the bottom surface of the housing, and these form each other's mirror image. When guiding the clamping components in the slanted portion of the respective recess, the distance in the transverse direction between the clamping hooks is varied at the same time that the distance in the longitudinal direction from a clamping hook to the housing is varied. When guiding the clamping components in the straight portion of the respective recess, only the distance in the longitudinal direction from a clamping hook to the housing is varied.

Optionally, the straight portion of the recess connects to the slanted portion, so that, from the front side to the rear side of the housing, the straight portion is arranged first, and then the slanted portion is arranged. Here, the front side of the housing is the side through which the clamping components protrude, and the rear side is opposite to the front side. In other words, the slanted portion and the straight portion form one continuous recess, the slanted portion being closer to the clamping hooks than the straight portion is.

Optionally, the activation mechanism comprises a connection component, which is at least partially positioned between the first and second clamping components, through one or more openings in each of the first and second clamping components, wherein the connection component forms a connection between the first and second clamping components such that the first and second clamping components are movable with respect to the connection component along transverse direction Y, while a movement in longitudinal direction X with respect to the connection component is blocked. For example, the connection component may be implemented as a plate or block, with a top and bottom surface that are parallel to an XY plane. For example, each of the clamping components may comprise a wall, extending in an XZ plane, and the connection component is positioned through an opening in the wall of the respective clamping components. The activation mechanism is adapted to drive, via other components that are comprised in the activation mechanism, the connection component along longitudinal direction X. A driving force in longitudinal direction X can thus be applied to the connection component. Since the connection component prevents the clamping components from moving longitudinally relative to the connection component, when the connection component is driven, the clamping components will move along with the connection component in the longitudinal direction X. On the other hand, the openings in the clamping components allow the clamping components to also move in the transverse direction Y. This way, the clamping components, when driven via the connection component, are allowed to follow the trajectory imposed by the guide elements.

Optionally, the activation mechanism comprises:

- a driving component, which is movable in the transverse direction Y and comprises a slanted edge, the slanted edge extending along to a direction which is slanted with respect to the longitudinal direction X and the transverse direction Y;
- a follower component, which is movable in longitudinal direction X and which is in contact with the slanted edge of the driving component, so that moving the driving component in transverse direction Y, causes a movement of the follower component in longitudinal direction X.

wherein the follower component is comprised in the connection component, so that moving the driving component in the transverse direction Y causes a movement of the first and second clamping components, at least in the longitudinal direction X.

The driving component is, for example, a block, plate, protrusion, or cam, comprising a slanted edge. The driving component is movable only in transverse direction Y; for example, the driving component may be moved by turning a screw. The follower component is moved as a result of moving the driving component. The follower component hereby moves in longitudinal direction X. For example, the driving component and follower component may together form a linear cam device, cam follower mechanism, or wedge cam. In one embodiment, the activation mechanism also comprises a resilient element which is adapted to push the follower component against the driving component or cam element.

For example, both the driving component and the follower component may comprise a slanted edge, wherein both slanted edges extend along the same direction, which is slanted with respect to the longitudinal direction X and the transverse direction Y. Both slanted edges are in contact with each other, so that when moving the driving component in transverse direction Y, both slanted edges slide over each other, and the follower component is propelled in longitudinal direction X. In an embodiment, the follower component comprises two opposite slanted edges, parallel to each other. For example, the slanted edges may be implemented as edges of a slanted slot. Also, in this embodiment, the driving component comprises two opposite slanted edges, so that the driving component can slide within the slanted slot of the follower component, the respective slanted edges being in contact with each other.

In each of the embodiments, the follower component is part of the connection component. Thus, the follower component is in contact with or fixedly connected to other elements of the connection component. In this way, putting the driving component and follower component into motion also results in a movement of the connection component, and thus also of the two clamping components. The latter movement occurs at least longitudinally, i.e. only longitudinally, or simultaneously longitudinally and transversely. Consequently, the activation mechanism allows to establish the movement of the clamping components via a single control command, namely the movement of the driving element, for example by turning a screw. This contributes to a fast and user-friendly way of establishing the connection between two profiles.

Optionally, the follower component comprises a slanted edge, which is parallel to the slanted edge of the driving component, so that when moving the driving component in the transverse direction Y, both slanted edges slide over each other. For example, the follower component may be implemented as a plate portion, wherein a groove or recess with a slanted edge is present. In an embodiment, the follower component comprises two parallel slanted edges, for example, implemented as walls of a slanted slot.

Optionally, the activation mechanism comprises a screw, extending according to the transverse direction Y, wherein the screw is positioned through a hole in the driving component. This hole is provided with a corresponding thread so that turning the screw around its axis results in a movement in the transverse direction Y of the driving component. In one embodiment, the head of the screw is formed such that it can be turned using an Allen wrench or screwdriver. In this way, tightening the screw is the only action required from the user to close and tighten the clamping hooks.

Optionally, the connector comprises one or more screws that are adapted to fix the housing within the first profile. This means that the connector is first inserted into the cavity of the first profile, and then secured within this profile using a screw. Typically, a small gap will be present for this purpose in the surface of the first profile.

According to a second aspect of the present invention, the objectives identified above are achieved by a system for connecting two profiles, wherein the system comprises:

- a connector according to the first aspect of the invention;
- a first profile, comprising a central cavity and open front side;
- a second profile, comprising an outer surface on which undercuts are made, wherein the housing of the connector is adapted to be placed within the cavity of the first profile so that in the unconnected state of the two profiles, the clamping components protrude through the open front side of the first profile, and wherein the clamping hooks of the connector are adapted to engage the undercuts of the second profile.

According to a third aspect of the present invention, the objectives identified above are achieved by using a connector for detachably connecting profiles in a modular system for temporary exhibition booths, the connector according to the first aspect of the invention.

SHORT DESCRIPTION OF THE DRAWINGS

FIG. 1 and FIG. 2 provide a 3D view of a connector according to an embodiment of the invention, wherein the front side of the connector is visible, and in the respective figures a different state of the clamping components is shown.

FIG. 3 provides a detailed view of a first and second pair of guide elements which are present in a connector according to an embodiment of the invention.

FIG. 5 shows a top view, and FIG. 6 shows a bottom view.

DETAILED DESCRIPTION OF EMBODIMENTS

Figure 1:
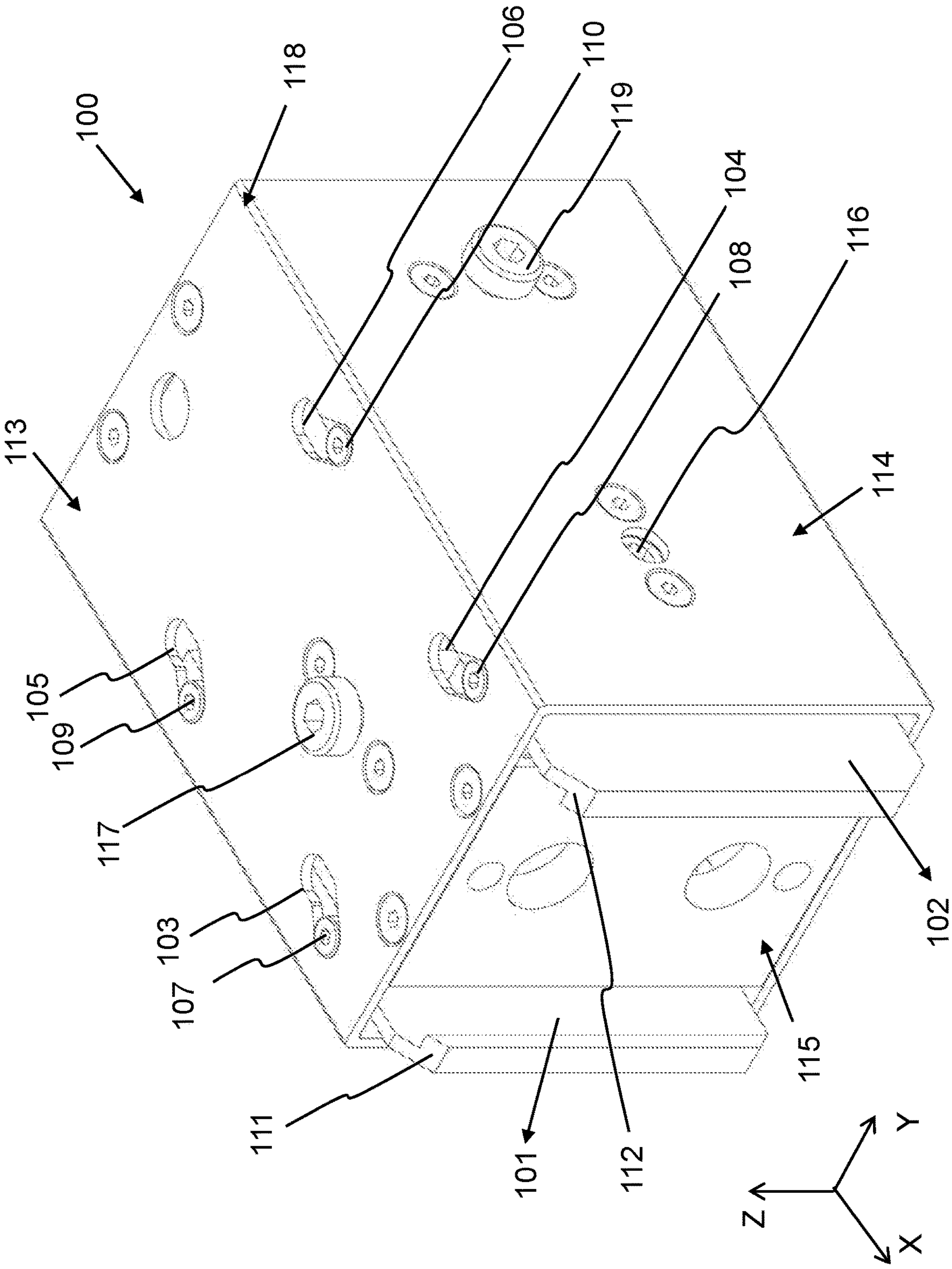
Figure 2:
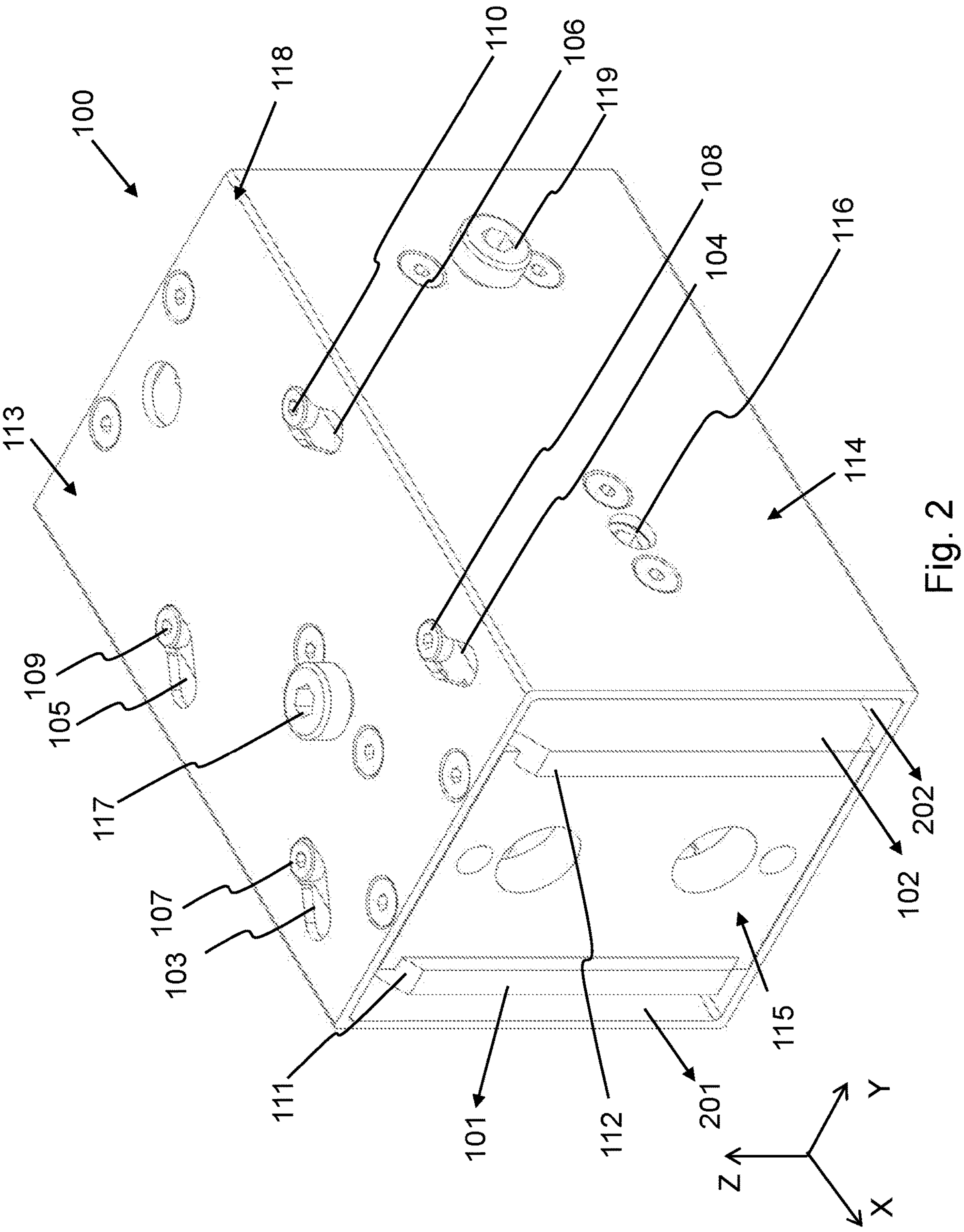
Figure 4:
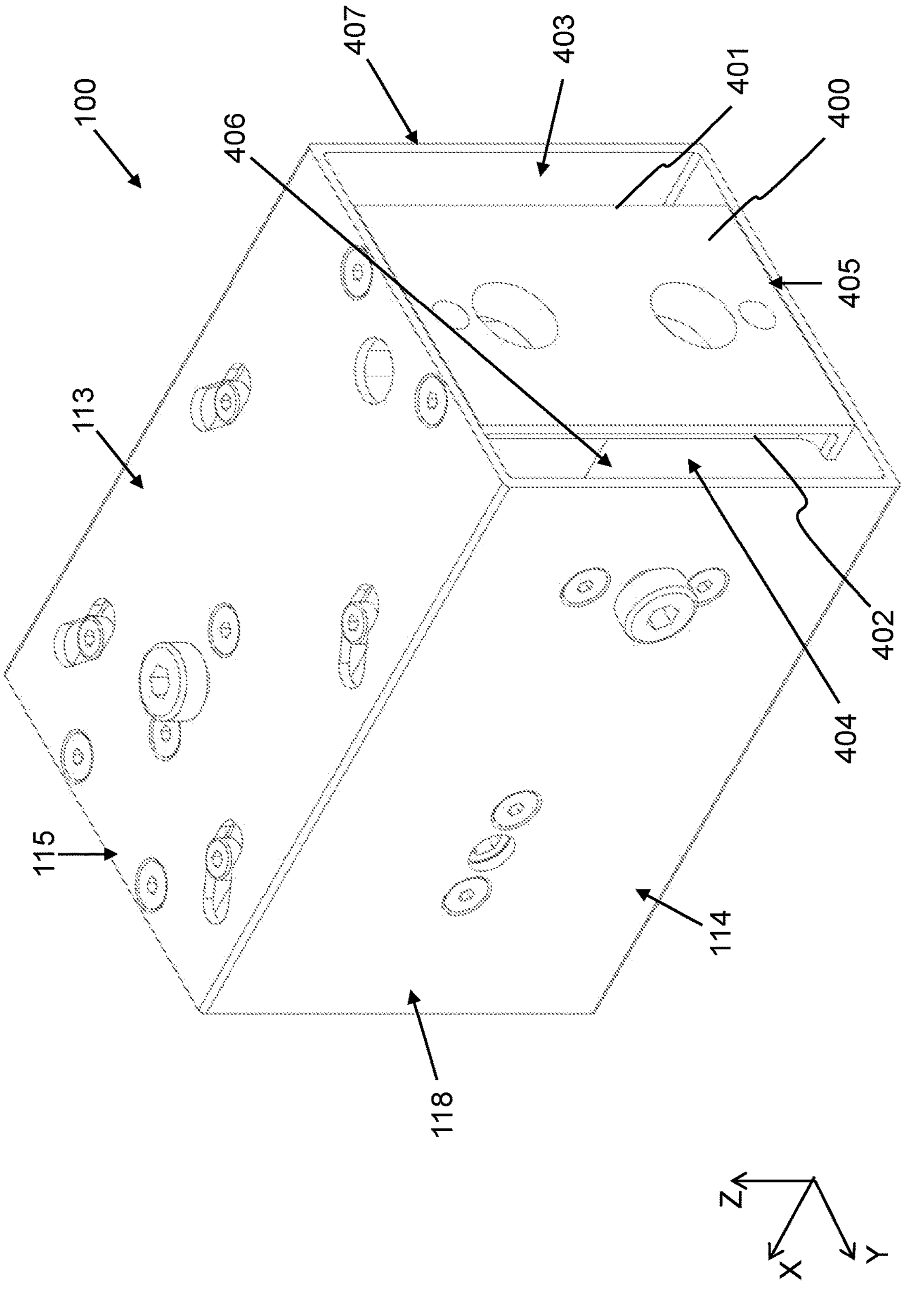
FIG. 4 shows a 3D view of connector according to an embodiment of the invention, wherein the rear side of the connector is visible.

FIG. 1, FIG. 2 and FIG. 4 show a connector 100, according to an embodiment of the invention. In FIG. 1 and FIG. 2, the front side 115 of the connector 100 is visible; in FIG. 4, the rear side 405 of the connector 100 is visible. The connector extends in longitudinal direction X, transverse direction Y and height direction Z. The connector 100 comprises a beam-shaped housing 118, bounded by a front surface 115 and rear surface 405, which are located in a YZ plane, a top surface 113 and bottom surface 406, which are located in an XY plane, and two side surfaces 114, 407, which are located in an XZ plane. The connector 100 further comprises a first clamping component 101, which is provided with a first clamping hook 111 at its front end, and a second clamping component 102, which is provided with a second clamping hook 112 at its front end. The clamping hook 111, 112 deflects with respect to the rest of the clamping component 101, 102, and has an end which is parallel to the transverse direction Y. In the embodiment shown, the clamping hooks 111 and 112 deflect towards each other, i.e., their ends are oriented towards each other.

In the condition shown in FIG. 1, the clamping components 101, 102 protrude maximally with respect to the housing 118, and the clamping components 101, 102 are opened maximally. The clamping components 101, 102 are thus partially located inside the housing 118, and partially outside the housing 118. The clamping components 101, 102 extend outward through openings 201, 202 in the front surface 115 of the housing 118. In the condition shown in FIG. 2, the clamping components 101, 102 are maximally retracted within the housing 118, and the clamping components 101, 102 are maximally closed. Thus, FIG. 1 and FIG. 2 each indicate an extreme state, with a corresponding position of the clamping components 101, 102; moving the clamping components 101, 102 varies their position between these two extreme states. The movement that the clamping components 101, 102 undergo in this process with respect to the housing 118 is a shift or translation. The trajectory or path followed by the first clamping component 101 during this movement is defined by a first pair of guide elements 107, 103. Analogously, the trajectory or path followed by the second clamping component 102 is defined by a second pair of guide elements 108, 104.

The first pair of guide elements comprises a protruding element 107 attached to the first clamping component 101, and a recess 103 attached to the housing 118. In the embodiment shown, the protruding element 107 is implemented as a pin or screw 107 which extends in height direction Z with respect to the clamping component 101. The protruding element 103 is implemented as a slot 103 which is arranged in the upper surface 113 of the housing 118. During movement of the first clamping component 101, the round head of screw 107 slides into the slot 103 so that the first clamping component 101 is guided in its movement, the shape of the slot 103 determining the followed trajectory. Furthermore, additional pairs of guide elements are provided to guide the first clamping component 101: a third pair of guide elements 109, 105, whose slot 105 is located in the upper surface 113, a fifth pair of guide elements 509, 800 whose slot 800 is located in the lower surface 406, and a seventh pair of guide elements 705, 706, whose slot 706 is located in the lower surface 406. These additional pairs of guide elements are implemented in the same manner as the first pair of guide elements 107, 103. For example, the slots 105, 800 and 706 have the same shape as slot 103.

Analogously, the second clamping component 102 is guided by a second pair of guide elements 108, 104. The second pair of guide elements 108, 104 comprises a protruding element 108, which is implemented as a screw or pin 108 attached to the second clamping component 102, and a recess 104, which is implemented as a slot 104 attached to the upper surface 113 of the housing 118. Furthermore, additional pairs of guide elements are provided to guide the second clamping component 102: a fourth pair of guide elements 110, 106, whose slot 106 is located in the upper surface 113, a sixth pair of guide elements 507, 801 whose slot 801 is located in the lower surface 406, and an eighth pair of guide elements 508, 704, whose slot 704 is located in the lower surface 406. These additional pairs of guide elements are implemented in the same manner as the second pair of guide elements 108, 104. For example, the slots 106, 801, 704 have the same shape as slot 104.

Figure 3:
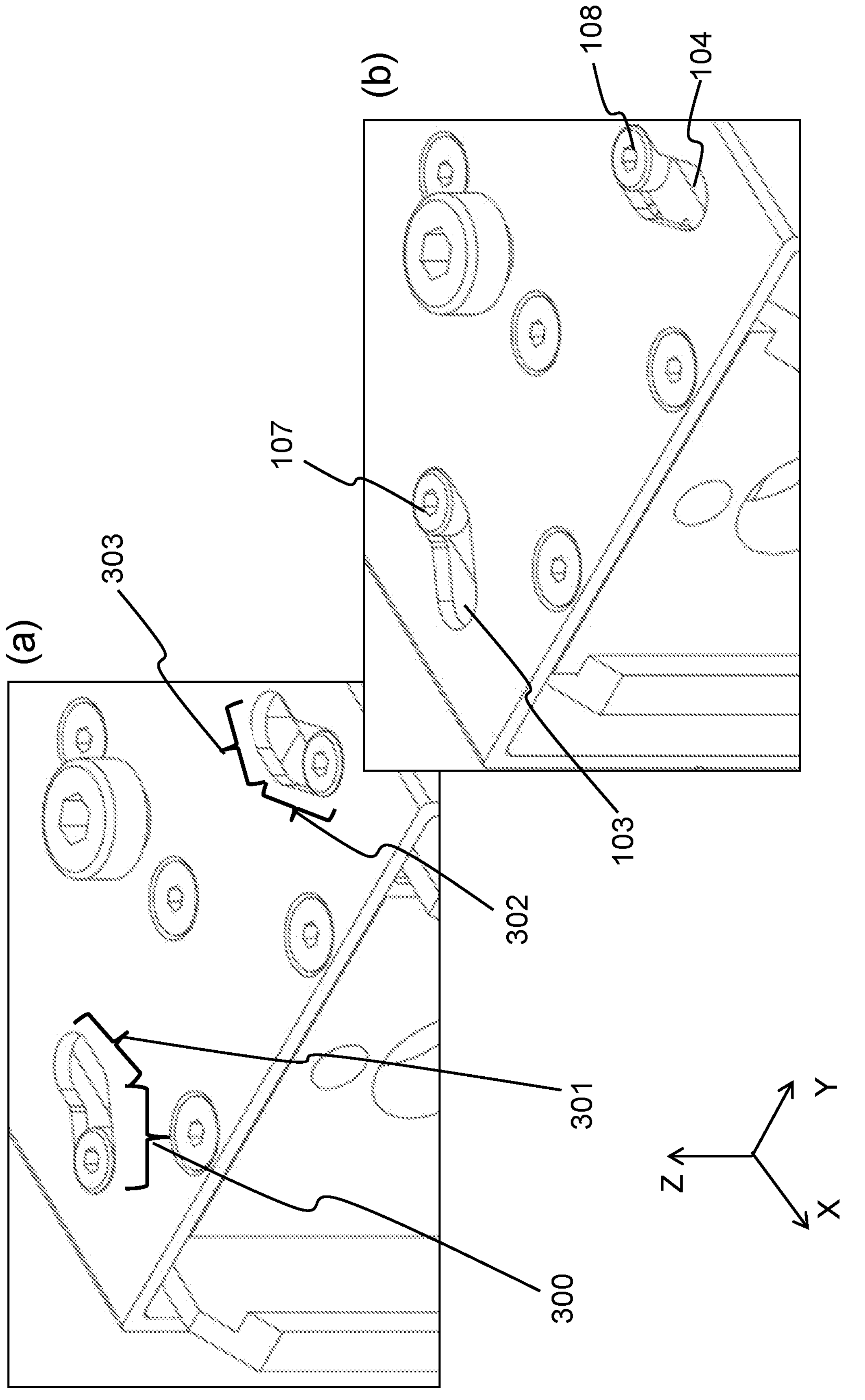

FIG. 3 shows a detailed view of the pairs of guide elements 107, 103 and 108, 104. FIG. 3(*a*) corresponds to the condition shown in FIG. 1, FIG. 3(*b*) corresponds to the condition shown in FIG. 2. The slot 103 comprises a slanted portion 300, according to a direction which is slanted with respect to the longitudinal direction X and slanted with respect to the transverse direction Y, followed by a straight section 301, according to a direction which is parallel to the longitudinal direction X. Viewed from the front side 115 towards the rear side 405, first the slanted portion 300, and then, following the slanted portion 300, the straight portion 301 is located. Analogously, the slot 104 comprises a slanted portion 302 followed by a straight portion 303. Both straight portions 301 and 303 are parallel, while the slanted portions 300 and 302 are oriented according to convergent directions. Viewed from the front side 115 towards the rear side 405, the slanted portions 300, 302 converge, i.e. their mutual distance in transverse direction Y reduces. Analogously, the remaining slots for guiding the clamping components 101, 102, each comprise a slanted portion and a straight portion.

While moving the clamping components 101, 102, the trajectory traveled is determined by the shape of the slots 103, 104. More specifically, starting from the state of FIG. 1, the pins 107, 116 are first guided within the slanted portions 300, 302. Consequently, during this first part of the trajectory, both the distance in transverse direction Y between the clamping hooks 111, 112 and the distance in longitudinal direction X between the housing 118 and the respective clamping hooks 111, 112 is reduced. This means that during the first part of the trajectory, the clamping hooks 111, 112 are both closed, and retracted with respect to the housing 118. Next, the pins 107, 116 are guided within the straight portions 301, 303. During this second part of the trajectory, only the distance in longitudinal direction X between the housing 118 and the respective clamping hooks 111, 112 is further reduced, but no more change occurs in the distance between the clamping hooks 111, 112 in transverse direction. After completion of the second part of the trajectory, the state of FIG. 2 is reached, with maximally closed and retracted clamping components 101, 102.

Figure 11:
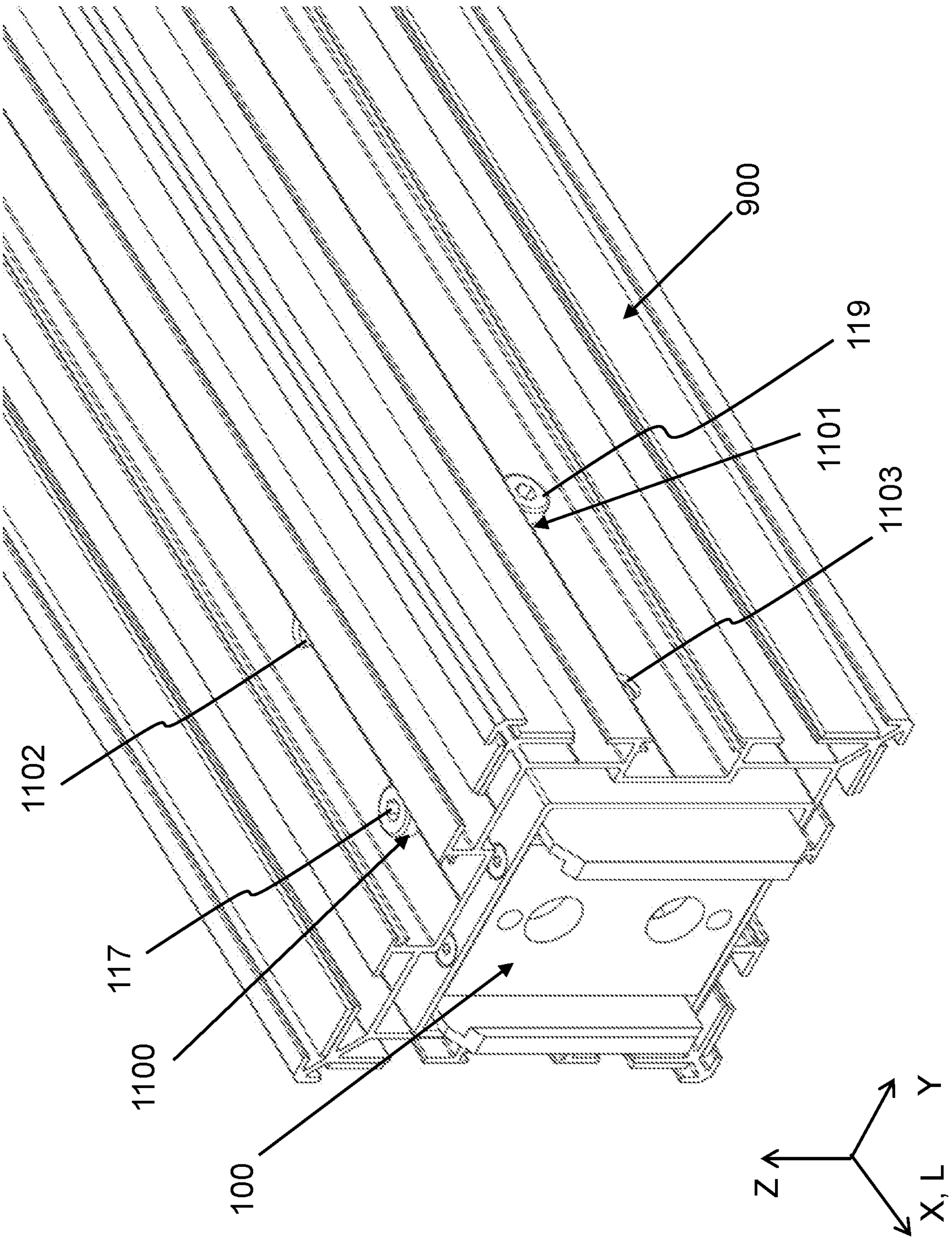
FIG. 11 shows a 3D view of a connector placed within a profile, according to an embodiment of the invention.
Figure 12:
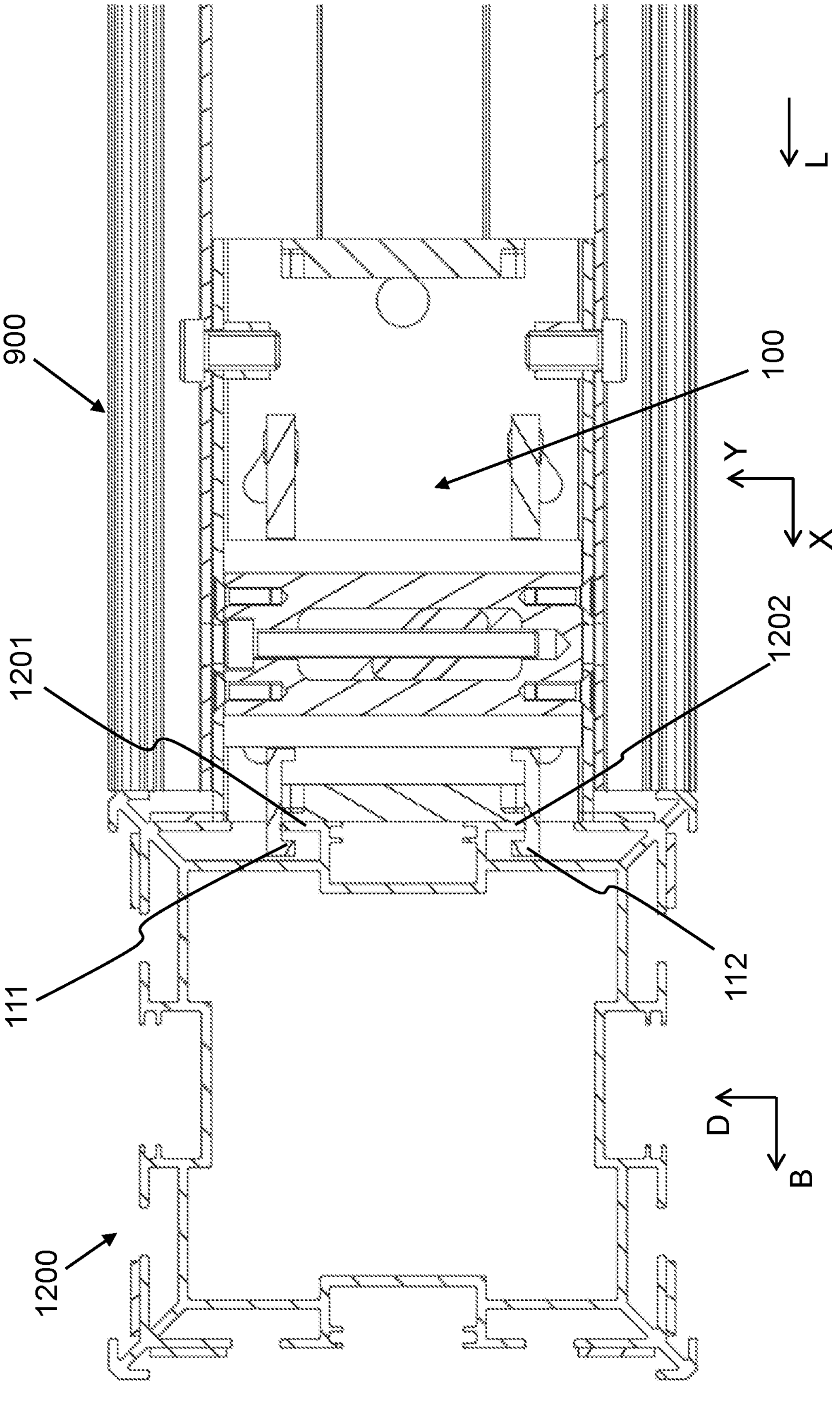
FIG. 12 illustrates how two profiles are connected together in a T-configuration, using a connector according to an embodiment of the invention.
Figure 13:
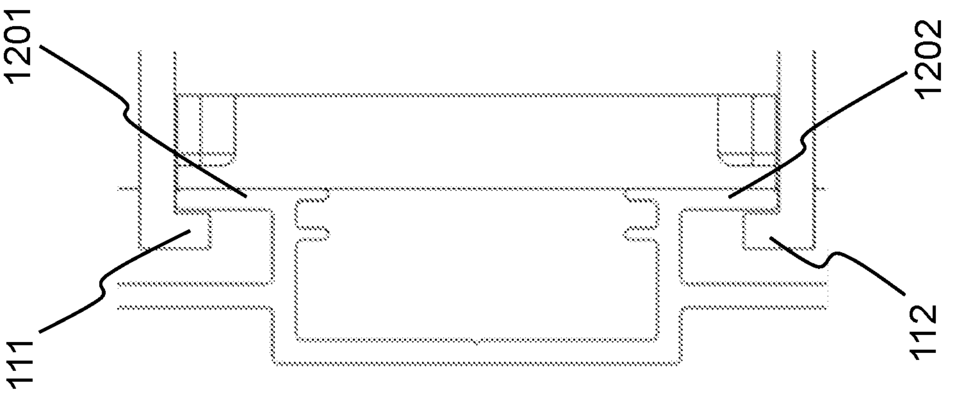
FIG. 13 shows in more detail the engagement of the clamping hooks on the profile surface, in the connected state.

After placement of the connector 100 within a first profile, a T-connection can be formed with a second profile, by having the clamping hooks 111, 112 engaged on undercuts in the surface of the second profile, as will be further illustrated in FIGS. 11-13. Furthermore, FIG. 4 shows that on the rear side 405 of the connector 100, a rear wall 400 is placed, with an opening 403, 404 on either side. The rear wall 400 is a plate which is located in a YZ plane, and provided with two edges 401, 402. As can be better seen in FIG. 7, the edges 401, 402 are formed as undercuts or undercut edges, on which the clamping hooks of another connector can engage. The edges 401, 402 are hook-shaped indeed so that a clamping hook 111, 112 can hook around the hook-shaped edge. This way, after placing two connectors in respective profiles, it is possible to form a connection in longitudinal direction between the two profiles, as will be further illustrated in FIG. 14.

The connector 100 further comprises an activation mechanism, as illustrated in FIG. 5-FIG. 8. The activation mechanism is adapted to move the clamping components 101, 102 with respect to the housing 118. The activation mechanism comprises a screw 703, a driving component 700, and a follower component which is part of a connection component 500.

Figure 5:
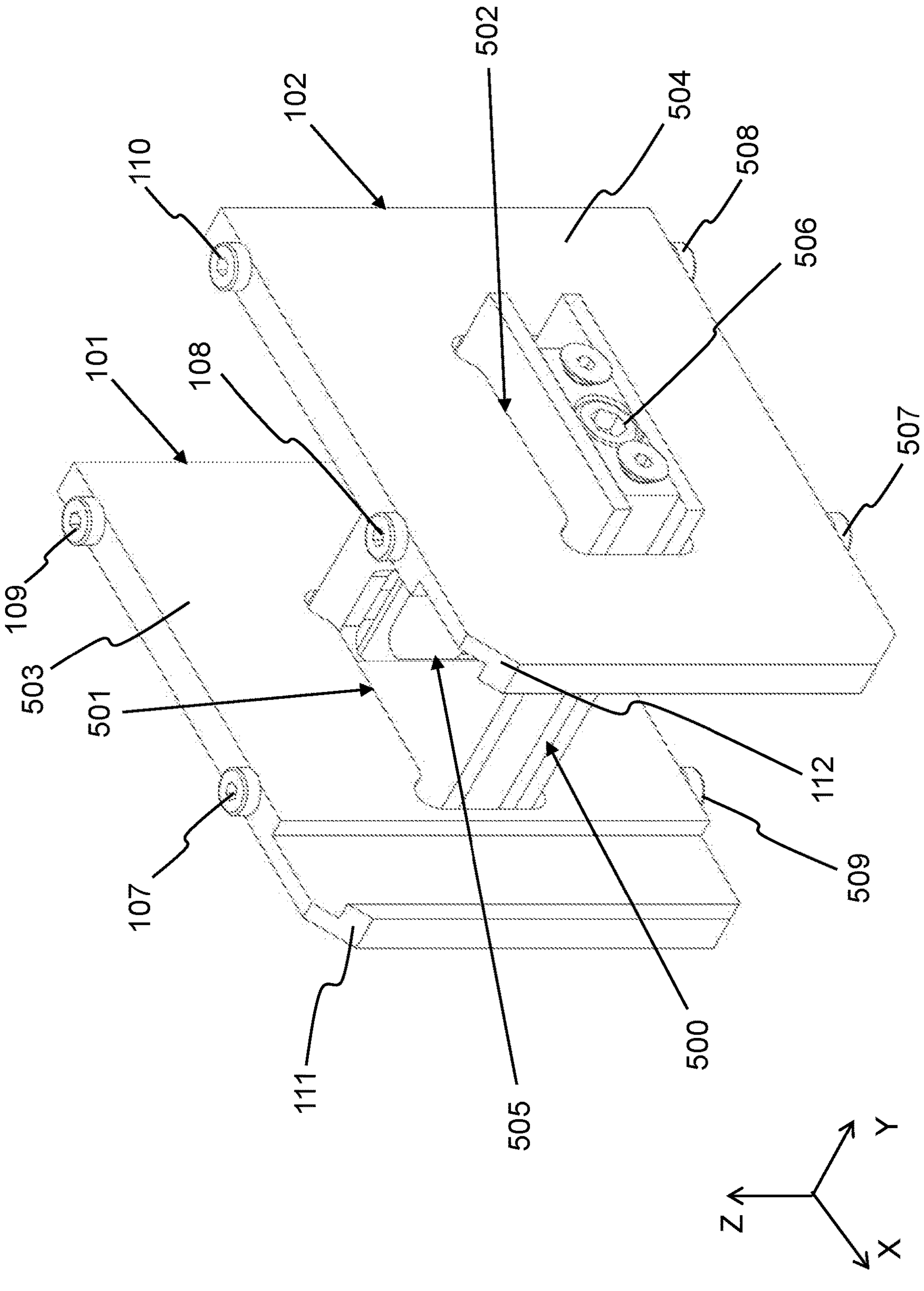
FIG. 5 and FIG. 6 show a 3D view of an assembly consisting of two clamping components and a connection component, as present within a connector according to an embodiment of the invention.
Figure 6:
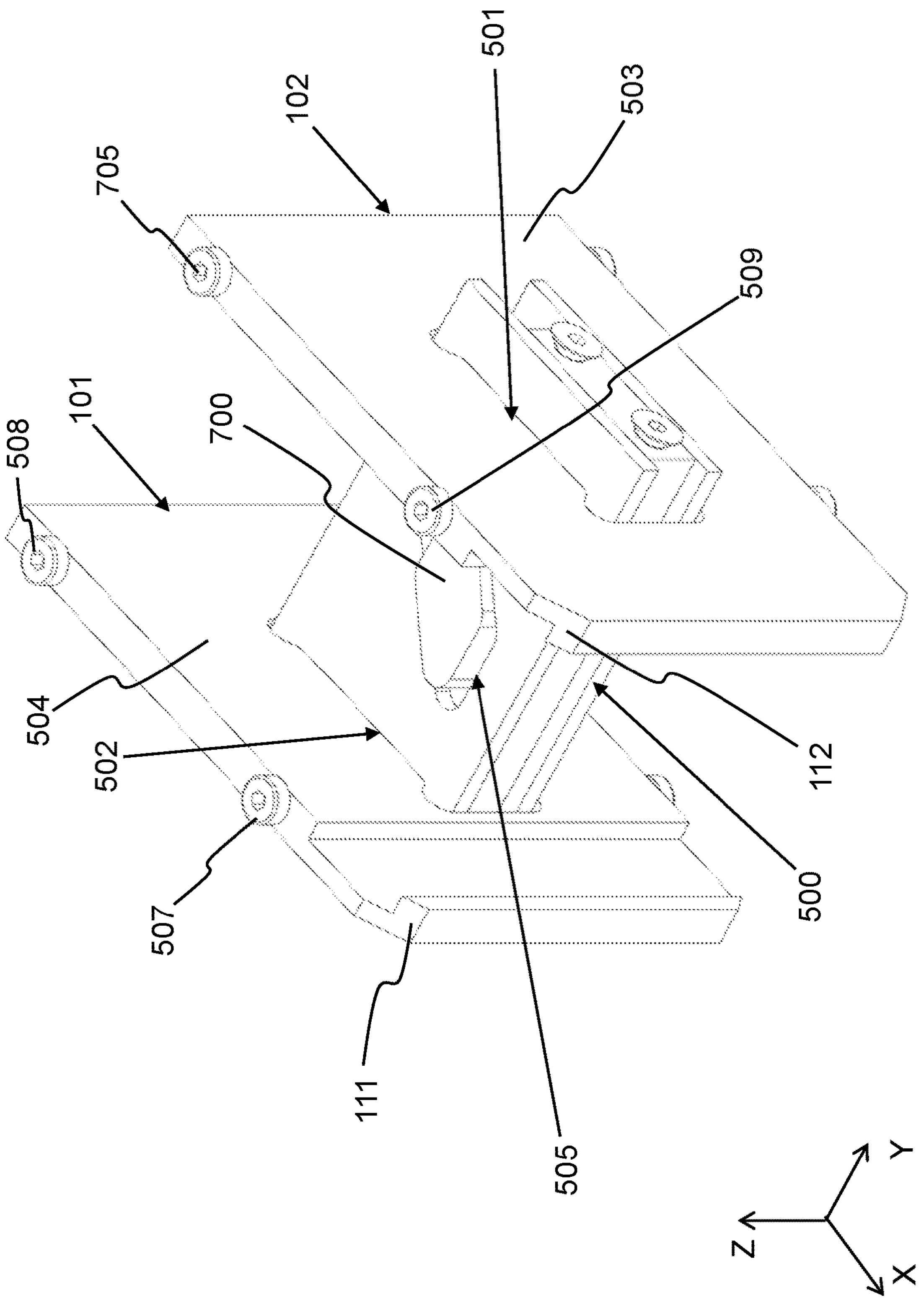

FIG. 5 and FIG. 6 show the clamping components 101, 102 and the connection component 500, wherein a top and bottom view are respectively shown. The first clamping component 101 comprises a plate-shaped wall 503, extending in an XZ plane. The clamping hook 111 is placed at the front side of the wall 503. Analogously, the clamping component 102 comprises a wall 504, with clamping hook 112 at the front. Both walls 503 and 504 are formed as plates and are parallel. On the upper edge of the wall 503, pins or screws 107, 109, are located, extending in height direction Z. On the lower edge of the wall 503, also two pins or screws are located. On the upper edge of the wall 504, the pins or screws 108, 110, are located, extending in height direction Z. On the lower edge of the wall 504 also two pins or screws, 507 and 508 are located. The first wall 503 comprises an opening 501, and the second wall 504 comprises an opposite opening 502. A connection component 500 is positioned through the openings 501, 502. The connection component 500 is plate-shaped, with a top surface and bottom surface which are located in an XY plane. The connection component 500 is partially located between the two clamping components 101, 102, and partially protrudes through the openings 501, 502. The clamping components 101, 102 are movable in transverse direction Y with respect to the connection component 500. In this way, the connection component 500 is shifting through the openings 501, 502. On the other hand, the clamping components 101, 102 are not moveable in longitudinal direction X with respect to the connection component 500; the edges of the openings 501, 502 block such a linear relative movement. Consequently, when the connection component 500 is moved according to longitudinal direction X, the clamping components 101, 102 will also be driven in longitudinal direction X.

The activation mechanism is adapted to drive the connection component 500 along longitudinal direction X, i.e., to initiate a linear movement of the connection component. The connection component 500 comprises a slanted slot 505, wherein a driving component 700 is placed. The slanted slot 505 has two opposite parallel slanted edges 701 and 702. The driving component 700 also comprises two opposite slanted edges, which are in contact with the respective edges 701 and 702. The driving component 700 is movable in transverse direction Y, by means of a screw 703. The screw 703 extends in transverse direction Y, and is positioned through a hole in the driving component 700, this hole being provided with corresponding thread. By rotating the screw 703 around its own axis, the driving component 700 is moved in the Y direction. In the embodiment shown, the head 506 of the screw 703 is adapted to be rotated by means of an Allen key. For this purpose, a small circular opening 116 is provided in the housing 118. The sections of FIG. 7 and FIG. 8 show two different states wherein the driving component 700 is moved in a transverse direction.

The portion of the connection component 500 wherein the slanted slot 505 is located serves as the follower component 505. When the driving component 700 is moved in transverse direction Y, the connecting component 500 is driven, thanks to the slanted slot 505, in longitudinal direction X, according to the principle of a cam. During this, the slanted edges 701, 702 of the follower component 505 slide over the respective slanted edges of the driving component 700. When driving the connection component 500 in longitudinal direction X, the clamping components 101, 102 are also moved longitudinally. During the first part of the trajectory, over the slanted portion of the slots 706, 704, the clamping components 101, 102 are moved both in the longitudinal direction and the transverse direction. The movement in the transverse direction is possible due the openings 501, 502. During the second part of the trajectory, over the straight portion of the slots 706, 704, the clamping components 101, 102 are moved only in the longitudinal direction.

Figure 7:
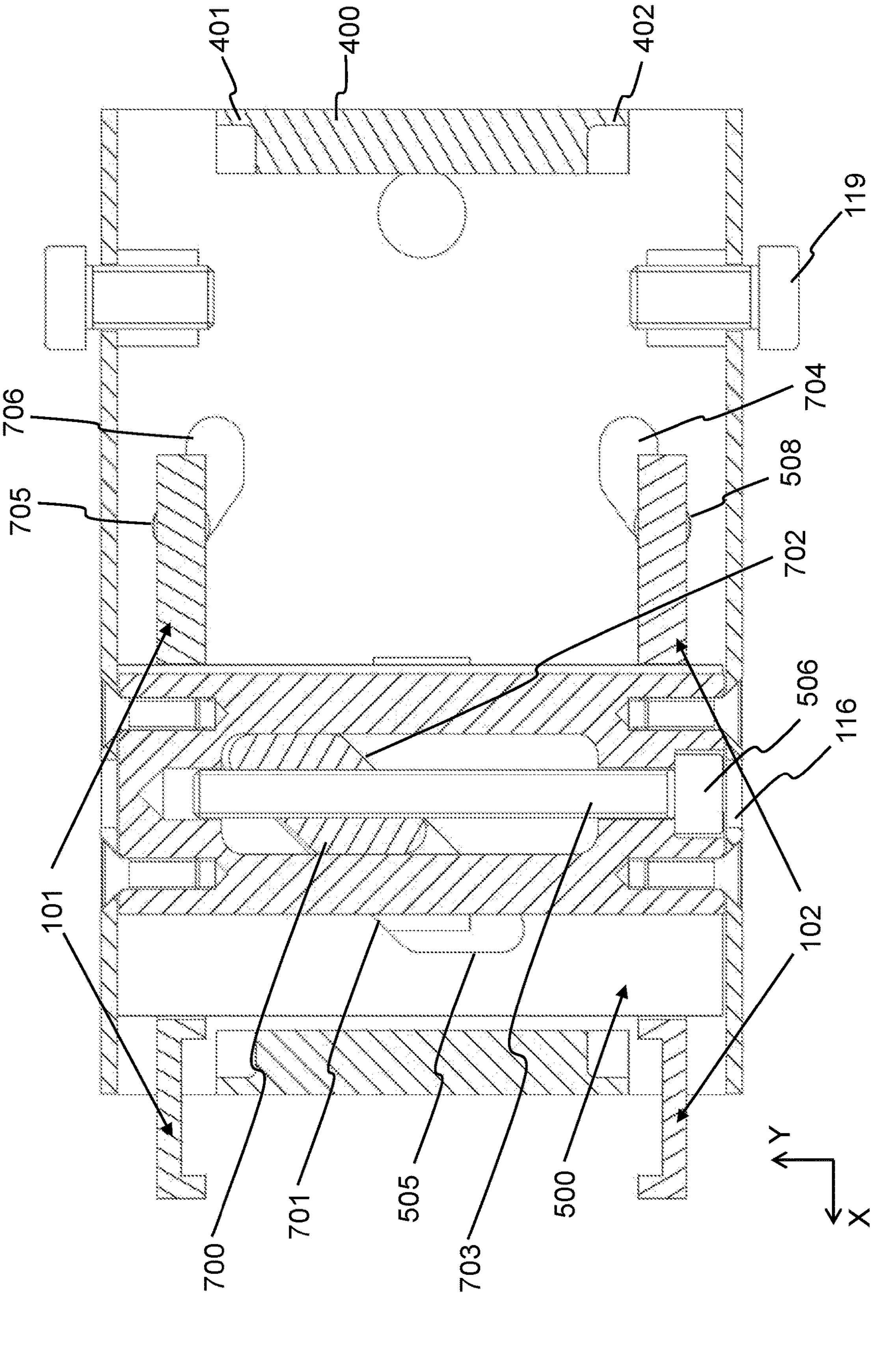
FIG. 7 and FIG. 8 show a sectional view of a connector according to an embodiment of the invention, wherein the activation mechanism of the connector is visible, and in the respective figures a different state of the clamping components is shown.
Figure 8:
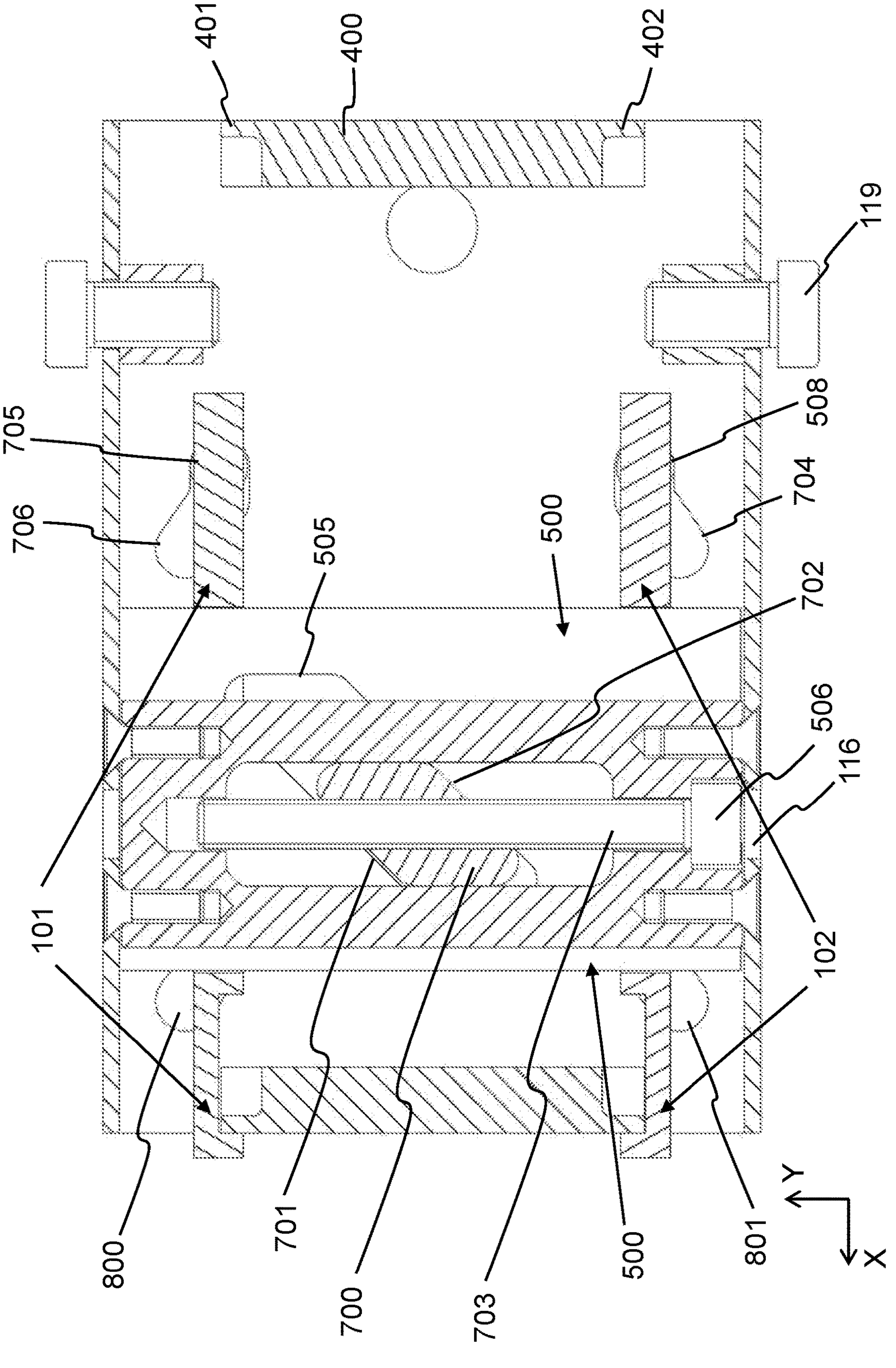

Starting from the state of FIG. 7, in this way, by turning the screw 703, the clamping components 101 are closed and retracted inside the housing, resulting in the state of FIG. 8. By turning the screw 703 in the opposite direction, the reverse movement can be achieved, again reaching the state of FIG. 7. FIG. 7 and FIG. 8 each depict an extreme state, wherein in FIG. 7 the clamping hooks 111, 112 are maximally opened and maximally protruded from the housing 118, and in FIG. 8 the clamping hooks are maximally closed and maximally retracted. FIG. 8 shows that in the latter state, the front end of the clamping component 101, 102 still protrudes over a small distance beyond the housing 118. Through the activation mechanism, the state of the connector can be varied between these two extreme states, wherein any intermediate state can also be achieved. At such an intermediate state, the clamping components are fixed at a position located between the positions shown in FIG. 7 and FIG. 8.

Figure 9:
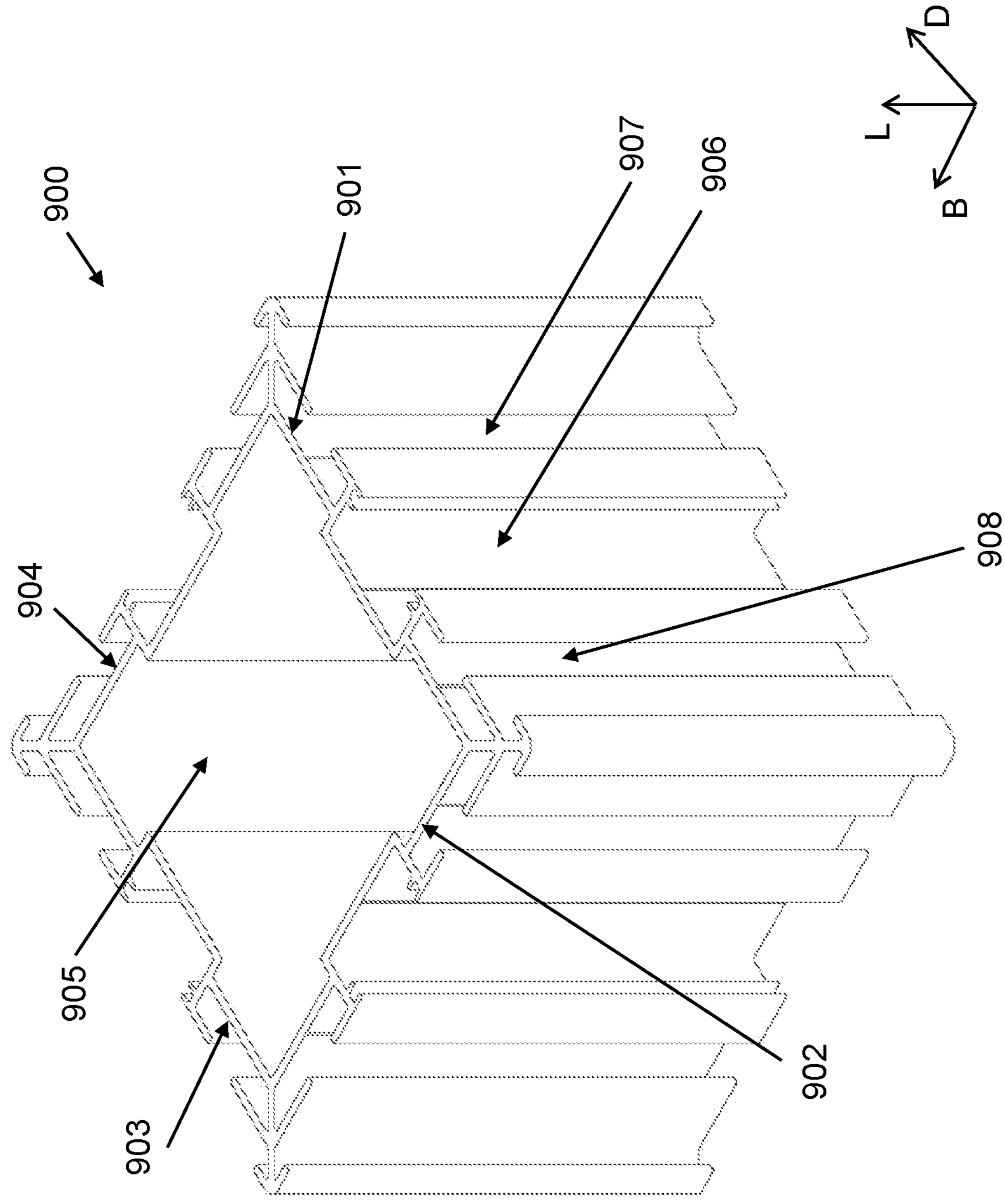
FIG. 9 shows a 3D view of a part of a profile, according to an embodiment of the invention.

FIG. 9 shows a profile 900 extending along a longitudinal direction L. The width and depth directions are indicated on the figure as 'B' and 'D' respectively. For example, this is a profile made of Aluminum. The figure shows only a portion of the full profile; typically the full profile 900 extends over a large length, for example in the order of 6 m in length. The profile 900 is hollow, with an open front side 905. The profile 900 comprises an upper wall 903 and bottom wall 901, which are located in an LD plane, and two side walls 902, 904, which are located in an LB plane. In the embodiment shown, the four walls 901-904 are constructed identically. A central slot or slot 906 is formed in the longitudinal direction L in the surface of each of the walls 901-904, which is adapted, for example, to accommodate a track rail for lighting. On either side of the central slot 906 additional slits or slots 907 and 908 are located, also in the longitudinal direction L. These additional slots 907, 908 allow for example for attaching specific components from a booth construction system.

Figure 10:
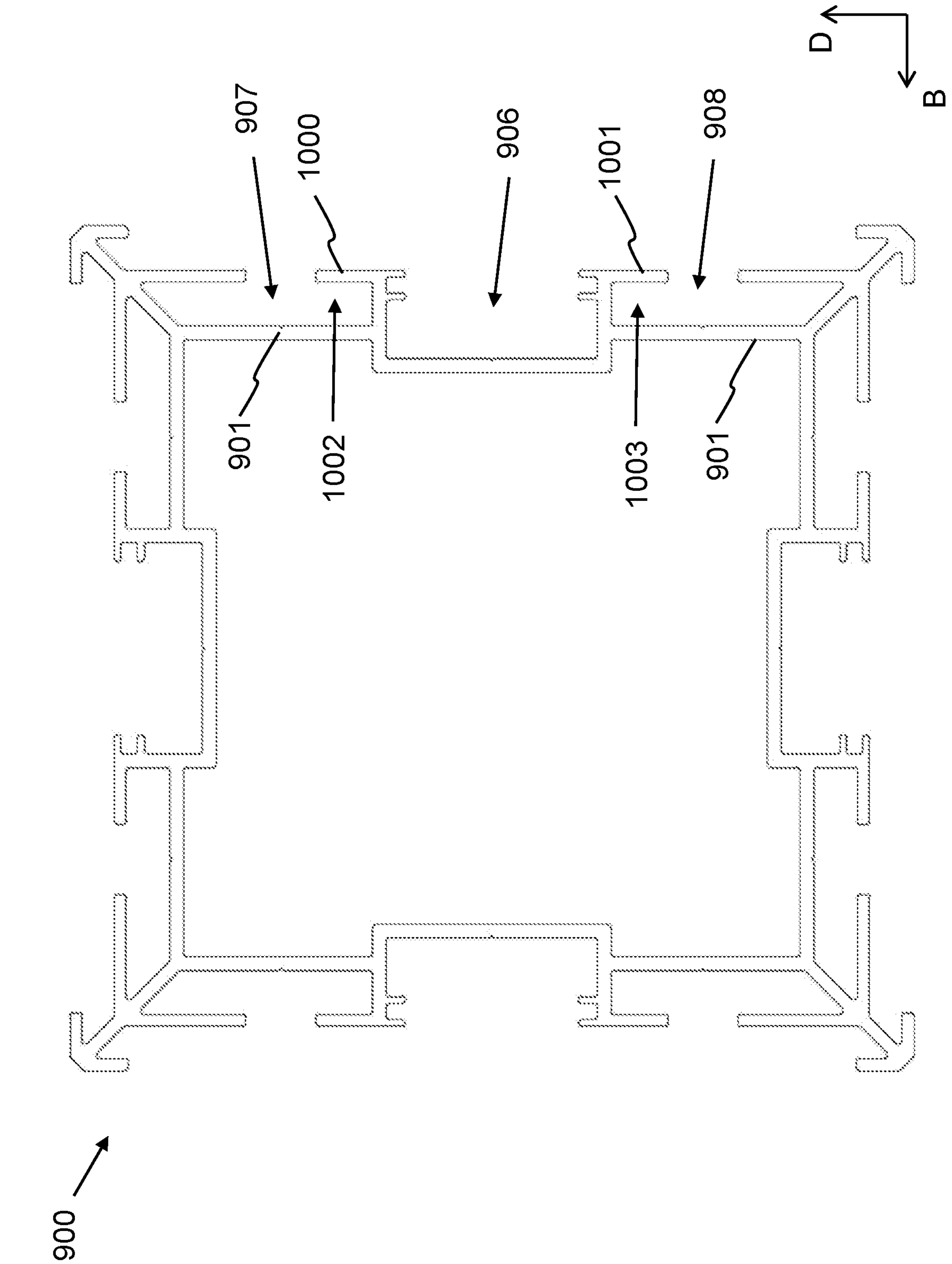
FIG. 10 shows a cross-sectional view of a profile, according to an embodiment of the invention.

The section of FIG. 10 shows that the profile surface is provided with undercut grooves 1002, 1003. These are grooves extending in longitudinal direction L, and each one is bounded by an undercut edge or undercut, 1000 and 1001 respectively. Each of the undercuts 1000, 1001 is formed as a hook-shaped edge. The undercut 1000 is thus hook-shaped, with a portion substantially perpendicular to the wall 901, thus, according to width direction B, and a portion substantially parallel to the wall 901, thus, according to depth direction D. In the embodiment shown, each pair of undercuts 1000, 1001 has ends which are oriented away from each other.

The beam-shaped housing 118 is adapted to be placed within the cavity of the profile 900, as illustrated in FIG. 11. When placing the connector 100, it is first inserted into the profile 900 through the open front side 905, and then fastened by using screws 117, 119. For this purpose, small circular holes 1100, 1101 are provided in the profile surface, which are adapted to receive the screws 117, 119. In FIG. 11, the clamping hooks 111, 112 are in a state wherein they are maximally open and protrude beyond the housing 118.

Consequently, via the connector 100, a T-connection can be made between the first profile 900 and a second profile 1200, as illustrated in FIG. 12. The second profile 1200 is formed like the first profile 900, although its length may differ. First, the opened clamping hooks 111, 112 of the connector 100 are placed over the undercut edges 1201, 1202 of the profile 1200. Then, by tightening the screw 703, for example using an Allen key, the clamping hooks 111, 112 are closed. In here, the first part of the trajectory defined by the slanted portions 300, 302 of the slots 103, 104, is travelled by the clamping components 101, 102. Besides closing the clamping hooks 111, 112, during this first part of the trajectory, also the clamping components 101, 102 are already partly retracted with respect to the housing 118. After travelling the first part of the trajectory, the state is reached as shown in FIG. 12.

Consequently, the connector 100 can be further tightened, by further turning the screw 703, wherein the two profiles 900, 1200 are pulled towards each other. During this second part of the trajectory, defined by the straight portions 301, 303 of the slots 103, 104, only a reduction of the linear distance takes place. The tightening of the connector 100 results in a state wherein the clamping hooks 111, 112 fit perfectly around the undercuts 1201, 1202, so that optimum clamping is obtained. In case a certain deviation is present on the dimensions of the undercuts 1201, 1202, for example due to manufacturing tolerances, wear or thermal expansion, optimal clamping can still be obtained, by tightening the connector more or less. Moreover, bringing the clamping hooks into the best-fit state requires only one control action, namely tightening the screw 703, which allows a quick connection.

Figure 14:
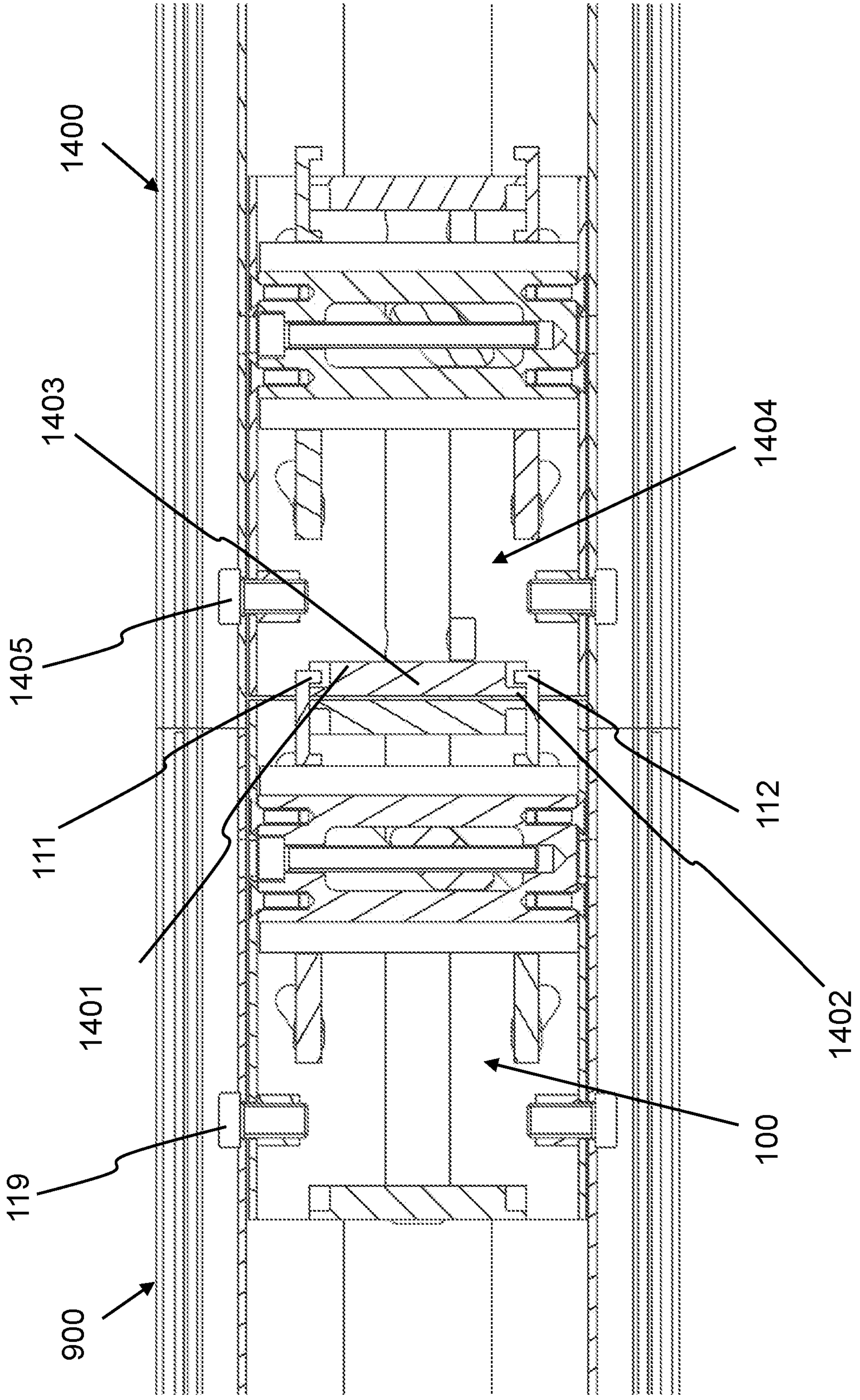
FIG. 14 illustrates how two profiles are connected together longitudinally using a connector according to an embodiment of the invention.

After placing the connector 100 within a first profile 900, it can also be used to form a connection in the longitudinal direction with a second profile 1400, as illustrated in FIG. 14. The second profile 1400 is formed like the first profile 900, although its length may differ. First, a second connector 1404 is inserted into the second profile 1400. The second connector 1404 is constructed identical to the first connector 100, but it is inserted into the profile the other way around, i.e., with its rear side facing the profile opening. The second connector 1404 is fixed in the second profile 1400 by means of screws, for example screw 1405. To allow a connector to be fixed in an inverted way in a profile, additional circular holes are provided in the profile wall at appropriate positions, see for example holes 1102 and 1103 in FIG. 11. After positioning of the second connector 1404, the clamping hooks 111, 112 of the first connector 100 may engage the rear wall 1403 of the second connector 1404, more specifically the undercut edges 1401, 1402. This allows starting from a state with opened clamping hooks 111, 112, and they are gradually closed and tightened via tightening screw 703.

Although the present invention has been illustrated by means of specific embodiments, it will be clear to those skilled in the art that the invention is not limited to the details of the preceding illustrative embodiments, and that the present invention can be implemented with various modifications and adaptations without leaving the scope of the invention. Therefore, the present embodiments are to be considered illustrative and non-restrictive in all respects, wherein the scope of the invention is described by the appended claims and not by the foregoing description, and all modifications that fall within the meaning and scope of the claims are therefore included herewith. In other words, it is understood that this includes all modifications, variations or equivalents that fall within the scope of the underlying basic principles and whose essential attributes are claimed in this patent application. Moreover, the reader of this patent application will understand that the words "comprising" or "comprise" do not exclude other elements or steps, that the word "a" does not exclude a plural. Any references in the claims should not be construed as limiting the claims in question. The terms "first," "second," "third," "a," "b," "c" and the like, when used in the description or in the claims, are used to distinguish between similar elements or steps and do not necessarily describe a sequential or chronological order. Similarly, the terms "top," "bottom," "over," "under," and the like are used for the purpose of description and do not necessarily refer to relative positions. It should be understood that those terms are interchangeable under appropriate circumstances and that embodiments of the invention are capable of functioning according to the present invention in sequences or orientations other than those described or illustrated in the above.

The invention claimed is:

1. A connector for detachably connecting profiles, said connector comprising:

a housing, extending along a longitudinal direction X, which is adapted to be placed within a tubular first profile;

a first and a second clamping component, which are partially located, according to the longitudinal direction X, within said housing, said first and second clamping components each comprising a clamping hook at their ends, which, at least partially, deflect according to a transverse direction Y, said clamping hooks being adapted to engage undercuts provided on a surface of a second profile;

an activation mechanism adapted to move said first and second clamping components with respect to said housing, wherein movement of each of the respective clamping components is a translation;

a first and a second pair of guide elements, each pair comprising a guide element provided on said housing, and a corresponding guide element provided on said first and second clamping component respectively, wherein said first and second pair of guide elements are adapted to define a trajectory of said first and second clamping component during said translation, respectively, so that at least during a part of said trajectory, a distance in the transverse direction Y between said clamping hooks is varied, and at least during a part of said trajectory a distance in the longitudinal direction X between said housing and said clamping hooks is varied, wherein said trajectory defined by said first and second pair of guide elements is such that during a first part of said trajectory at least the distance in the transverse direction Y between said clamping hooks is varied, and during a second consecutive part of said trajectory, the distance in the longitudinal direction X between said housing and said clamping hooks is varied, while the distance in the transverse direction Y between said clamping hooks is not varied, wherein during said first part of said trajectory the distance in the transverse direction Y between said clamping hooks is varied, while the distance in the longitudinal direction X between said housing and said clamping hooks is also varied, wherein said clamping hooks are each oriented toward an inside of said housing, and wherein during said first part of said trajectory, reduction of said distance in the longitudinal direction X between said housing and said clamping books is accompanied by the reduction of said distance in the transverse direction Y between said clamping hooks.

2. The connector according to claim 1, wherein said housing comprises a front side through which said clamping components protrude, and a rear side opposite to said front side, and wherein said rear side comprises two edges or two undercuts, which are adapted to be engaged by clamping hooks of a neighbouring connector.

3. The connector according to claim 1, wherein said first and second pair of guide elements, each comprise:

a protruding element arranged on said first and second clamping component respectively, comprising a pin or screw, and a recess arranged in said housing, comprising a groove, slot or slit arranged in said housing, wherein said protruding element is adapted to slide into said recess.

4. The connector according to claim 3, wherein said recess, comprised in said first and second pair of guide elements, is arranged in an upper surface or a lower surface of said housing, said upper surface and lower surface extending along longitudinal direction X and transverse direction Y, and wherein said protruding element, comprised in said first and second pair of guide elements, extends in height direction Z, perpendicular to said longitudinal direction X and transverse direction Y.

5. The connector according to claim 4, wherein a first and second said recess, which are comprised in said first and second pair of guide elements, respectively, each comprise:

a straight portion, according to a direction parallel to the longitudinal direction X, and a slanted portion, according to a direction which is slanted with respect to the longitudinal direction X and with respect to the transverse direction Y, and wherein said slanted portion comprised in said second recess and said slanted portion comprised in said first recess extend according to convergent directions.

6. The connector according to claim 5, wherein said housing comprises a front side through which said clamping components protrude, and a rear side opposite said front side, and wherein said straight portion connects to said slanted portion, so that, from said front side towards said rear side, first said slanted portion is arranged, and then said straight portion.

7. The connector according to claim 1, wherein said activation mechanism comprises a connection component, which is at least partially positioned between said first and second clamping components, through one or more openings in each of said first and second clamping components, wherein said connection component forms a connection between said first and second clamping components such that said first and second clamping components are moveable with respect to said connection component according to transverse direction Y, while a movement in longitudinal direction X with respect to said connection component is blocked.

8. The connector according to claim 7, wherein said activation mechanism comprises:

a driving component, movable in transverse direction Y and comprising a slanted edge, said slanted edge extending according to a direction which is slanted with respect to the longitudinal direction X and the transverse direction Y;

a follower component, movable in longitudinal direction X and in contact with said slanted edge of said driving component, so that moving said driving component in transverse direction Y causes a movement of said follower component in longitudinal direction X, wherein said follower component is comprised in said connection component, so that moving said driving component in transverse direction Y causes a movement of said first and second clamping components, at least in longitudinal direction X.

9. The connector according to claim 8, wherein said follower component comprises a slanted edge, which is parallel to said slanted edge of said driving component, so that when moving said driving component in transverse direction Y, said slanted edges are sliding over each other.

10. The connector according to claim 8, wherein said activation mechanism comprises a screw extending along transverse direction Y, wherein said screw is positioned through a hole in said driving component, said hole having corresponding threads, so that twisting said screw around its axis results in a movement in transverse direction Y of said driving component.

11. The connector according to claim 1, wherein said connector comprises one or more screws adapted to fix said housing within said first profile.

12. A system for connecting two profiles, said system comprising:

a connector according to claim 1;

a first profile, comprising a central cavity and open front side;

a second profile, comprising an outer surface on which undercuts are arranged, wherein said housing of said connector is adapted to be placed within said cavity of said first profile, so that in an unconnected state of said two profiles, said clamping components protrude through said open front side of said first profile, and wherein said clamping hooks of said connector are adapted to engage said undercuts of said second profile.

* * * * *